United States Patent
Cecco et al.

(10) Patent No.: US 6,310,631 B1
(45) Date of Patent: *Oct. 30, 2001

(54) USER INTERFACE CONTROL FOR CREATING SPLIT PANES IN A SINGLE WINDOW

(75) Inventors: Robert Cecco, Thornhill; Eduardus A. T. Merks, North York, both of (CA); Roger P. Spall, Southampton (GB); Michael Wulkan, Markham (CA)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/843,082

(22) Filed: Apr. 25, 1997

(30) Foreign Application Priority Data

Apr. 26, 1996 (CA) .................................................. 2175148

(51) Int. Cl.[7] .................................................... G06K 15/00
(52) U.S. Cl. ........................................... 345/792; 345/798
(58) Field of Search .................................. 345/340–347, 345/798, 799, 800, 792

(56) References Cited

U.S. PATENT DOCUMENTS

| | | | |
|---|---|---|---|
| 5,060,170 | * 10/1991 | Bourgeois et al. | 345/342 |
| 5,371,847 | * 12/1994 | Hargrove | 345/342 |
| 5,390,295 | * 2/1995 | Bates et al. | 345/342 |
| 5,487,143 | * 1/1996 | Southgate | 345/342 |
| 5,559,946 | * 9/1996 | Porter | 345/342 X |
| 5,577,187 | * 11/1996 | Mariani | 345/342 |
| 5,649,133 | * 7/1997 | Arquie | 345/342 X |
| 5,712,995 | * 1/1998 | Cohn | 345/342 |
| 5,714,971 | * 2/1998 | Shalit et al. | 345/340 X |
| 5,737,558 | * 4/1998 | Knight, III et al. | 345/342 |
| 5,796,402 | * 8/1998 | Ellison-Taylor | 345/342 |
| 6,043,817 | * 3/2000 | Bolnick et al. | 345/798 |

OTHER PUBLICATIONS

Cohen et al., "Constraint–Based Tiled Windows", IEEE, pp. 2–11, Nov. 1984.*

Cohen et al, "Automatic Strategies in the Siemens RTL Tiled Window Manager", IEEE, pp. 111–119, 1988.*

* cited by examiner

Primary Examiner—Steven Sax
(74) Attorney, Agent, or Firm—Edward H. Duffield; Bracewell & Patterson, L.L.P.

(57) ABSTRACT

An improved method is disclosed for creating and sizing panes within a window of a display screen of a computer system as part of an interactive graphical user interface. Grab handles are positioned in the borders of the panes. When a grab handle of a pane is selected by user interaction, an adjustable rectangular form is created on the screen which represents a new pane. The existing pane is split in an arbitrary manner. The size of the new pane can be varied so as to include areas of the screen from other existing panes. The existing panes are then reconfigured so as to be accommodated on the screen along with the newly created pane.

13 Claims, 8 Drawing Sheets

USER INTERFACE CONTROL FOR CREATING SPLIT PANES IN A SINGLE WINDOW

BACKGROUND OF THE INVENTION

1. Field of the Invention

This invention generally relates to interactive user interfaces within video display terminal screens in computing systems, generally referred to as graphical user interfaces. The invention more particularly relates to improvements in the use of panes in a window of a graphical user interface and provides control for creating split panes and sizing the panes within a window.

2. Background of the Invention

The concept of graphical user interfaces has become well known by computer users and is incorporated in many computer systems and computer operating systems. In general, a graphical user interface operating environment can be thought of as an end user environment that is graphical, such that the end user interfaces with the environment via a variety of elements on a display screen including windows, icons, menus, pointing devices, etc. Computer systems that use graphical user interfaces were first introduced to the market by Apple® and later adopted by Microsoft® with its Windows® program, and by IBM® with OS/2® and Presentation Manager®. A common feature of such systems is that a multitude of windows or view ports can be present simultaneously on the computer display screen. Different application programs can be running concurrently in each of the windows displayed on the screen. The user can use a mouse or other input device to move back and forth between different windows, thereby making it possible to perform many different tasks.

A feature of graphical user interfaces is that previously coded programming commands are replaced by graphic images or icons on a computer screen. These icons symbolically represent a variety of objects or operations the computer system will execute when the icons are chosen. A user interacts with the computer by choosing and manipulating these icons.

The graphical user interface is a facility provided by the application framework or by the operating system of the computer which presents the icons to the user via the display screen for presentation to the user of visual aspects of a program or data. The function of the program will be that which is visually represented by the icon. Many of the methods and icons used in graphical user interfaces have become standardized. In essence, a window is a portion of a computer screen that is used to display information and a pane is a portion of a window or could also include the entire window.

Descriptions of specific implementations of graphical user interfaces are readily available and can be obtained in technical literature provided by companies who manufacture such computer systems and operating systems using graphical user interfaces, such as Sun Microsystems Inc.®, International Business Machines Corporation®, Apple Computer Inc.® and Microsoft Corporation®. Even though the use of windows and panes in computing systems today has become well known and are expected by users of such computer systems and in some respects have become somewhat sophisticated, there are still a variety of shortcomings with existing graphical user interfaces and in particular, how panes within windows can be duplicated, split and modified. Examples of the manipulation of panes in windows are described in the subsequent representative references.

U.S. Pat. No. 5,390,295, entitled "Method and Apparatus for Proportionally Displaying Windows on a Computer Display Screen", issued to International Business Machines Corporation® on Feb. 14, 1995, describes a method and apparatus for logically organizing windows on a display screen. The amount of time each of the windows is presented to the display screen is monitored. Windows that are active a longer period of time are displayed more distinctively than windows that are active a shorter length of time. Windows are displayed on the display screen having a window size proportional to the length of time each of the windows is active. Windows that have not been active long enough to exceed a minimum window tiling threshold are displayed as icons outside of the window.

WO 94/24657 is a PCT Published Patent Application, dated Oct. 27, 1994, to Apple Computer Inc.®, and is entitled "Interactive User Interface". One aspect of this patent application is the provision of an icon in the form of a split-bar box added to the normal window or pane scroll bar. By selecting a desired item or object which is in the existing pane, and dragging the item or object and dropping it on the split-bar box, a routine is invoked that creates a new pane on the screen. This opens up the display of the item or object on the new pane without affecting the display in the existing pane. Thus, in effect, by this action the window is split into two panes which are of fixed and non-variable sizes.

U.S. Pat. No. 4,890,098 entitled "Flexible Window Management on a Computer Display" issued Dec. 26, 1989, to International Business Machines Corporation®. This patent description provides for managing windows in a display system and allows a user to mark an area on the display to define the dimensions and contents of a resized window. All text and attributes within the enclosed area are incorporated into the new, larger window, however the original windows do not lose their original characteristics. The marked area may span multiple windows so multiple windows may be incorporated into the newly resized window. In this manner, a window can be enlarged to incorporate the contents of several windows by enclosing several windows in the marked area.

Thus, existing technology does somewhat permit the re-sizing of panes or windows in a graphical display. It is also apparent that the use of icons in the border of frame areas of a window can be used to facilitate creating new or additional panes.

SUMMARY OF THE INVENTION

It is therefore an object of this invention to provide a solution which allows users to interactively create new panes and size them at the same time.

It is another object of the invention to provide for greater flexibility and control over inserting new panes in a computer display screen to make better use of the screen real estate.

It is a further object of the invention to allow users to divide a single, existing pane into two panes which take up the same space as the previous pane but also permits new panes to accommodate space from multiple, existing panes.

According to the invention, these and other objects are accomplished by a method of controlling the size and number of panes in a window on a display screen within a computer system. The computer system has at least a display, user controls for manipulating a cursor and a processor. The method comprises the computer-implemented and user interactive steps of displaying a pane in the window having divide grab handles (or pane modification means) in the border or frame of the pane, positioning the cursor on the screen by use of the user control, pressing and holding the user control while the cursor is positioned over a grab handle (pane modification means) to display a variable rectangle (transparent sizing window that stretches like a rubber band) on the screen as to where a new pane will appear and moving the cursor control to change the size and position of the variable form, as by dragging via cursor movement, and finally releasing the user control to cause a new pane to appear in the window. The position and sizes of existing panes are changed accordingly to accept the new pane on the display screen.

According to another aspect of the invention, there is provided in a computer system which is programmed to display one or more windows and a cursor on a screen. Each window has a pane which is bounded by a border or frame. The improvement comprises pane modification means (divide grab handle) in a border of a pane whereby upon movement of a cursor over a grab handle, the cursor visually changes appearance and by pressing and holding the mouse button while the cursor is over a grab handle, an adjustable new pane is created within the screen space of the original pane.

According to a further aspect of the invention, there is provided in a computer system, a method of inserting a pane on the display screen which has a plurality of existing panes and at least one pane has a pane modification means. The pane modification means of the one pane is activated to display a variable rectangular form on the screen. The size of the variable rectangular form is changed to provide a resultant rectangular form which encompasses portions of the screen which are included in one or more of the existing panes. Upon release of the user control, a new pane is created which is equal in size to the resultant rectangular form and also the existing panes are resized so that the display screen now includes the new pane along with all of the existing panes.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

As has been indicated above, a common feature in graphical user interface systems today is the capability to divide a single window into multiple panes. Each of the panes can then present separate or related information for the user to work with. Common designs in computer systems provide a fixed number of panes in a window as it may be assumed that the user will not need to add or remove panes as work is carried out and completed. This restriction is sometimes impractical as in certain situations, users require the flexibility to be able to tailor panes in order to satisfy certain working requirements. Other than the limited capabilities of what has been provided for in the prior art as discussed above, there is no known practical way to provide this additional needed flexibility to a user.

This commonly available feature, along with the apparent limitations, can be illustrated with reference to FIG. 1 which shows a restricted prior art pane technique. When the user requires a new pane, it must be specified where the new pane will reside, especially if the new pane will occupy space in the screen currently allocated by the system to existing panes. There are spatial and geometric limitations caused by rectangular panes. Panes are typically tiled to each other and this results in restrictions as to where new panes can be added to the screen in order that the current panes will be positioned in a consistent manner. A limited solution that attempts in some way to address these shortcomings is that new panes are added by dividing or splitting current panes into equal or fixed areas of the screen which are essentially half of the area of the original pane.

Figure 1A:
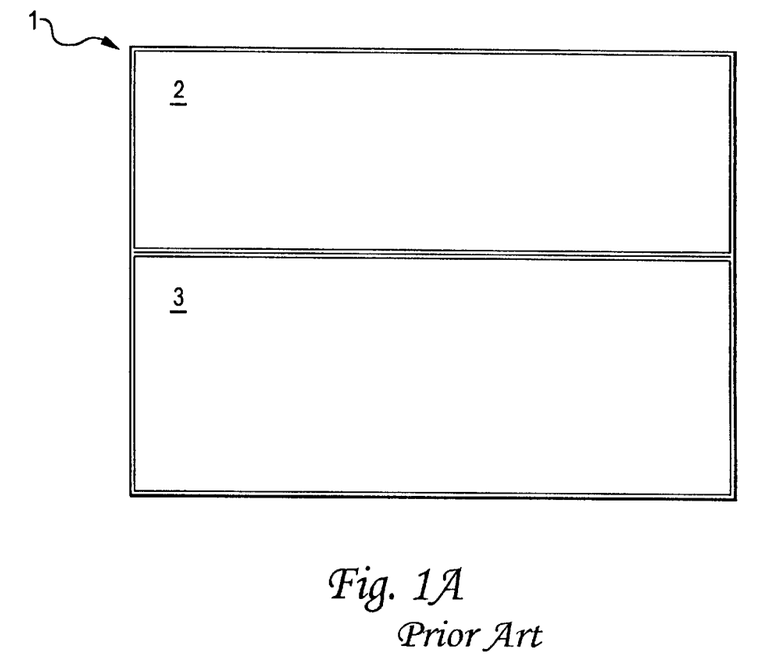
FIGS. 1A and 1B illustrate screen views of prior art panes.
Figure 1B:
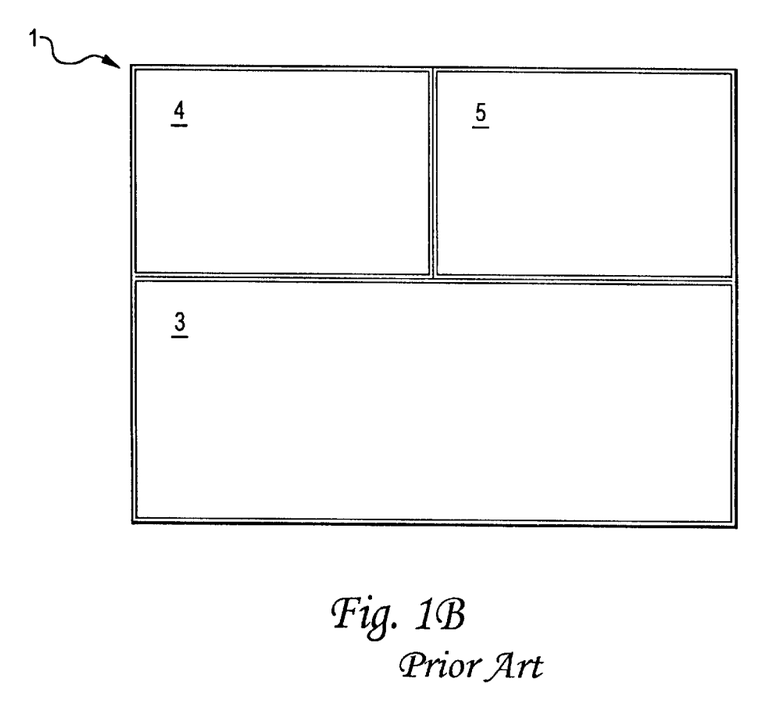

With reference to FIG. 1A of the drawings which shows generally graphical user interface screen 1 as consisting of two panes as shown by the reference numbers 2 and 3. The top pane, pane 2, is to be divided vertically (it could also be divided horizontally) in order to create an additional pane. This is typically accomplished in a well known manner by the activation of a split pane technique which may arise from the use of an icon in the border area of the window, which is not shown in this case. With reference to FIG. 1B, this shows the configuration of the screen after the division has taken place. Pane 2 from FIG. 1A has been divided into panes 4 and 5. The other pane 3 in the window remains unaltered.

The present invention, which can be characterized as an insert pane operation, provides a solution that not only accomplishes the previously described prior art restricted task of splitting existing panes in half, but also allows a user to place, in a somewhat arbitrary manner, new panes of arbitrary size into an existing pane configuration.

Figure 2:
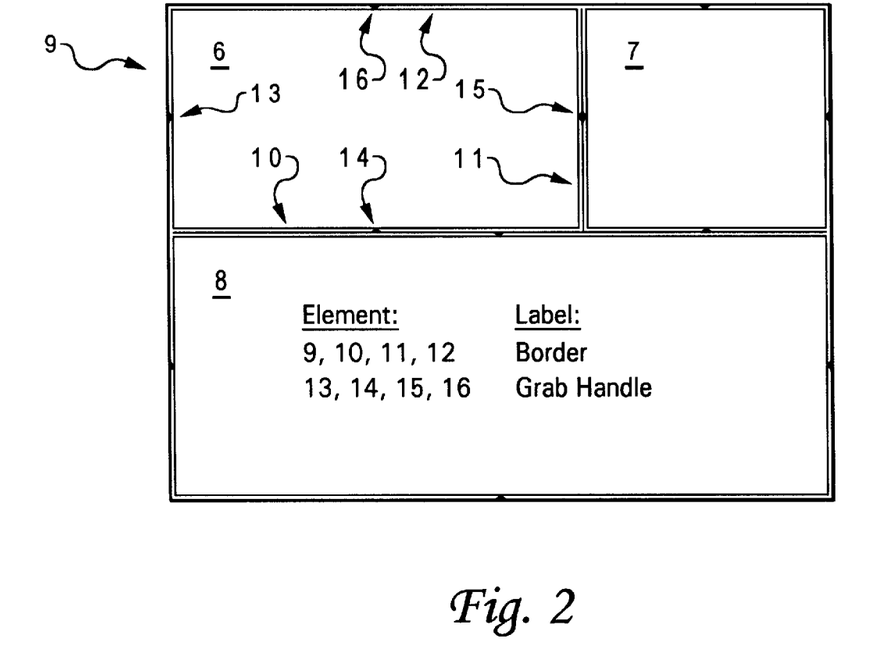
FIGS. 2, 3, 4A, 4B, 5A, 5B, 5C and 6 illustrate screen views showing various aspects of the invention and changes to panes caused by a computer system in response to various user interactions.

FIG. 2 of the drawings shows a plurality of panes 6, 7 and 8 according to the present invention. For illustrative purposes, only one pane will be described in detail but the same comments and features may apply to all three panes in FIG. 2. Pane 6 is circumscribed on all four sides by borders or margins having the reference numbers 9, 10, 11 and 12. Pane 6 has been modified from conventional pane designs to include divided grab handles 13, 14, 15 and 16, one on each border of the pane. The name "divide grab handle" or "grab handle" was chosen so as to readily indicate to the reader and user of this new system that when the divide function is activated via a well known click and drag action, the operating system would provide the functional capability to result in the action of dividing and re-sizing the pane.

The divide grab handles 13, 14, 15 and 16 can also be generically referred to as pane modification means. In the preferred embodiment, pane 6 of FIG. 2, the grab handles 13, 14, 15 and 16 are located in the centers of the respective borders 9, 10, 11 and 12. Although this is the preferred embodiment for the location of the grab handles 13, 14, 15 and 16, it is readily apparent that such pane modification means could be placed at any other location along the borders of pane 6.

Figure 3:
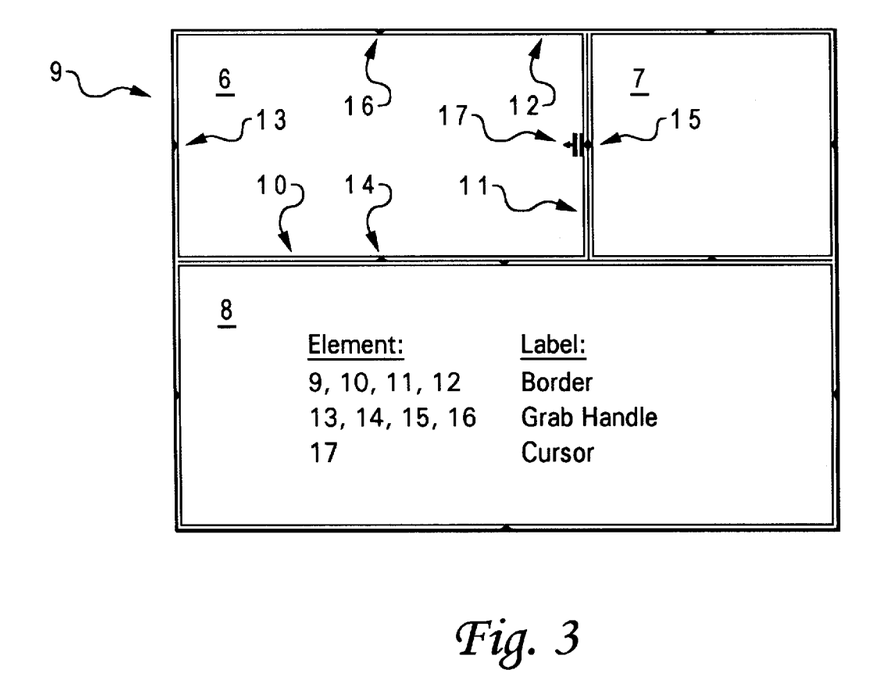

FIG. 3 of the drawings illustrates the change in a cursor once the cursor is moved over a grab handle in response to the movement of a mouse or any other user control device, including keyboard, joystick and lightpen, as is well known in the art. For this example, reference could be made to grab handle 15 in border 11 of pane 6 in FIG. 2. The result is shown in FIG. 3. The cursor 17 changes from what may be a normally recognized cursor similar to an arrowhead, to another form. The form that has been selected for this invention, as shown in FIG. 3, consists of two parallel bars and having an arrow perpendicular to one of the bars. The two parallel bars indicate that a pane splitting action will be taking place and this will occur in the direction of movement of the cursor in the direction of the arrow. Thus, the change in the appearance of the cursor indicates to the user that an additional function is now available and has been initiated. As is indicated, FIG. 3 represents the cursor 17 when grab handle 15 in border 11 of pane 6 has been activated. The similar new cursor design would result with the direction of the arrow changed accordingly if the other grab handles 13, 14 or 16 had been selected. Thus, with the existence of the appropriate arrow in the new cursor, it becomes readily apparent in which direction the cursor is to be moved for the subsequent splitting.

The appearance of the new cursor is not critical to the invention. The cursor design as shown in FIG. 3 is found to be practical, although it is really only sufficient for the invention that the cursor change appearance and any appropriate cursor design could be used.

When the user clicks and holds the mouse button with the cursor over one of the grab handles, the change which occurs is illustrated with reference to FIGS. 4A and 4B. These figures show a similar pane structure as exists in FIGS. 2 and 3. Once a grab handle on a pane border has been selected, a transparent adjustable rectangular shape or form, or what can be thought of as a "rubber band", appears within the pane thereby indicating where the new pane will appear. As all panes are of a rectangular shape, it is appropriate therefore that the rubber band also be of a rectangular shape. As the user continues to move the cursor resulting from movement of the mouse while holding down a mouse button, the rubber band rectangle changes size accordingly and tracks to the current mouse pointer position.

Figure 4A:
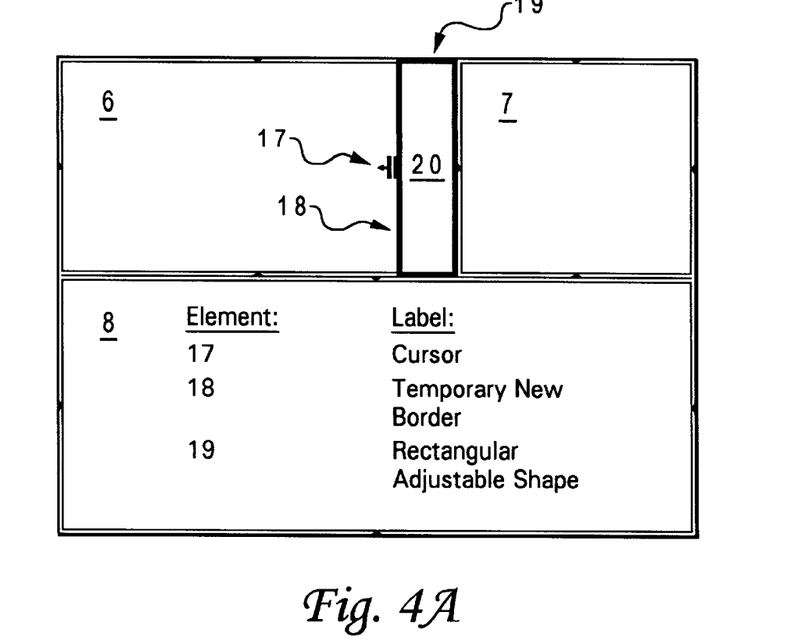
Figure 4B:
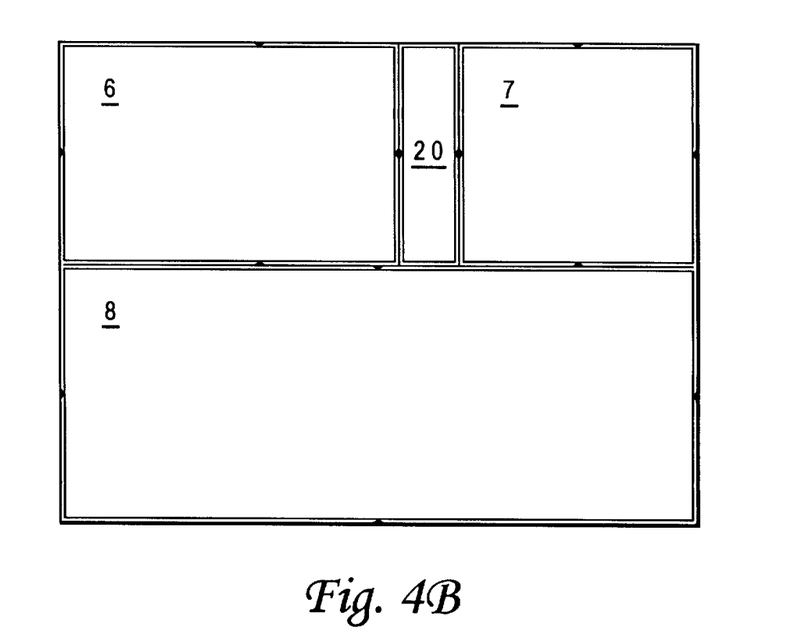

Returning to the discussion of FIGS. 4A and 4B which provide an illustrative example of the invention, FIG. 4A illustrates where the process of the creation of a new pane, or pane splitting, has been partially completed. The temporary new border 18 or part of the created rectangular adjustable shape 19, is being moved to the left as shown by the arrow on cursor 17 in response to movement of the mouse. Temporary border 18 originated at the right hand border 15 of existing pane 6. Existing pane 6 is of a design and configuration as was previously discussed for pane 6 in relation to FIGS. 2 and 3.

The grab handle 15 of right hand border 11 has been selected as has previously been described, by moving the cursor over the grab handle 15 and the mouse button clicked and held. The cursor then changes appearance as has also been previously described in relation to FIG. 3 and the new border 18 moves to the left as depicted by the cursor arrow 17 on border 18 in FIG. 4A. Thus, this figure shows that original pane 6 is in the process of being divided by the movable border 18 and the creation of a new pane 20 within rectangular adjustable shape 19.

As soon as the user lets go of the mouse button and after the border 18 of the adjustable rectangular shape 19 has been located to the desired new location, as shown in FIG. 4B, a new pane 20 is added to the display which is of the shape and configuration of the resultant rubber band where the border 18 was last positioned. The current or existing pane 6 is sized and changed accordingly by the software to fit into the new screen configuration and the features of all panes are returned to normal as discussed in conjunction with FIG. 2.

Figure 5A:
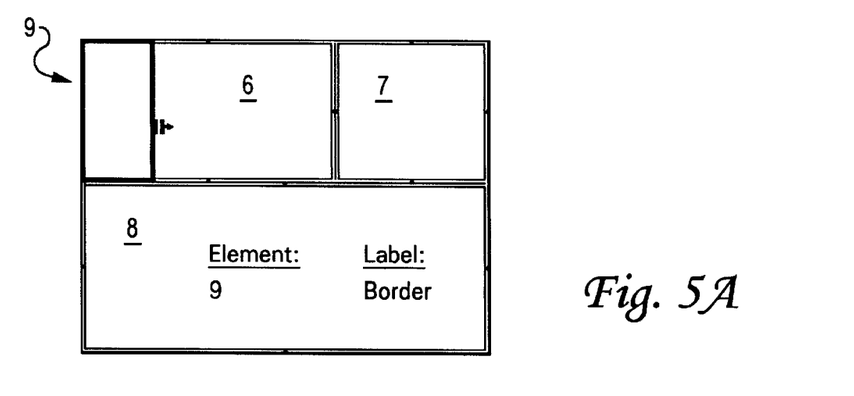

In general, in accordance with the invention, the size of the adjustable rubber band rectangle shape is constrained to the extent of the window in which the panes are located. An important feature of the present invention, however, is that the rubber band rectangle can cover essentially an entire screen irrespective of the number of existing panes in the screen. The rubber band rectangle can cross one or a multiple of panes, thereby splitting the single or multiple panes. FIGS. 4A and 4B showed the splitting of a single pane. In a similar manner, FIG. 5A shows the start of splitting of a single pane using a similar process as described above but starting from the left border 9 of pane 6.

Figure 5B:
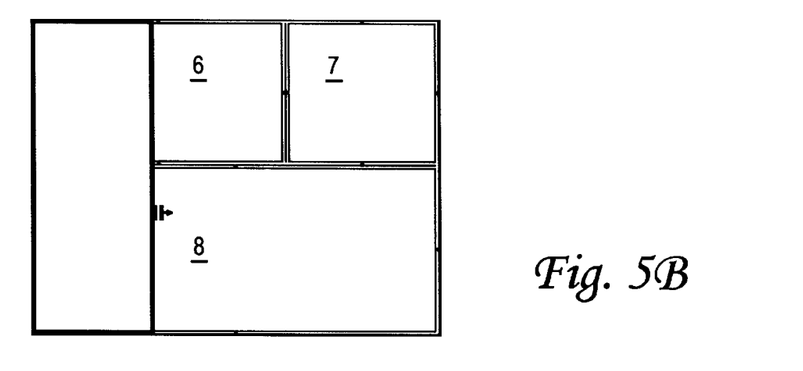
Figure 5C:
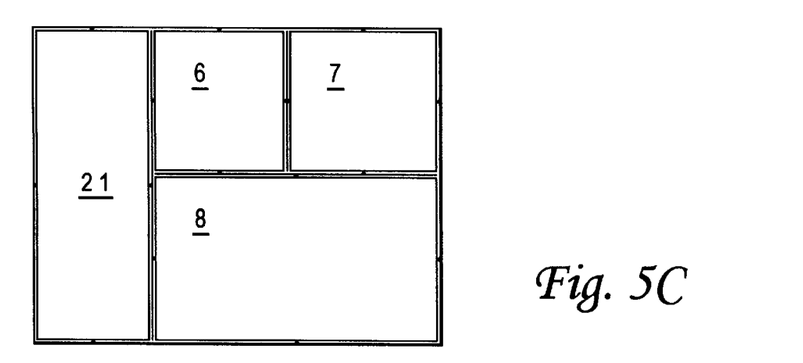

FIG. 5B shows the extension of the adjustable rectangle having been moved further to the right but also to the bottom into pane 8 thereby encompassing screen space from both panes 6 and 8. FIG. 5C shows when the mouse has been released and a new pane 21 created, with the size of panes 6 and 8 having been adjusted accordingly. In other words, the adjustable rectangle shape under the control of the mouse movement, can adopt screen space or screen real estate of other panes existing in the window. Once this is done, and the desired size and shape of the adjustable rectangle is achieved, and the mouse button released to thereby fix the shape of the new pane, all of the existing panes in the screen are reconfigured to accommodate the size and shape of the new pane, under the control of the operating software. The ratio of the relative sizes of the existing panes remains the same in the resultant screen display.

It should be apparent that the arrangement of the number and size of panes in FIGS. 2, 3, 4 and 5 are for purposes of illustrating the invention only and in no way should be considered as limiting or restricting the manner in which the invention may be applied or the pane arrangement in which the invention would be found to be useful.

For convenience, it is also possible at any time to cancel the insert pane operation by merely depressing the ESC key as may be available by the functioning of the operating software. It is also recognized that alternative arrangements could be provided for the functioning of grab handles, which could be readily implemented, for example, by the operating software by holding the CTRL key as the cursor is moved across the border of the pane.

Figure 6:
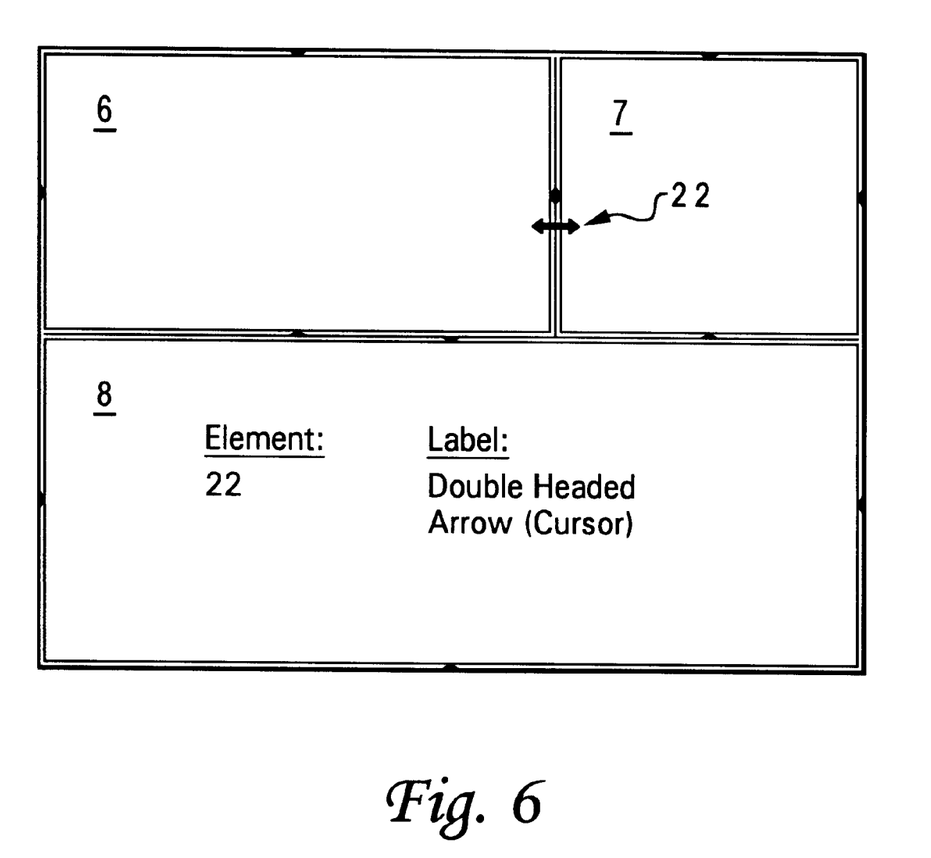

Screen space can be saved by using the frame borders as a resize border. The touching borders of two adjacent panes can be grabbed and both borders can then be adjusted simultaneously in accordance with the invention. This is illustrated in FIG. 6 by the double headed arrow 22 on the mutual borders of panes 6 and 7 in the previous examples shown in FIG. 2.

As is apparent to those skilled in the art, all of the aforementioned functions can be available and provided by the operating system of the computer system involved, and can be available in any properly programmed personal computer or host computer system.

It should be recognized that inserting panes within a window display is typically considered to be an expert task and should only be employed by those that are familiar with the various functions involved and the results that may be obtained. It may therefore be desirable to not always have the divide grab handles (pane modification buttons) within the border areas readily available to all end users. When the grab handles or buttons are hidden, users cannot then access this function and are therefore not distracted by its availability. However, when the grab handles are visible the functions described herein can be then used and provide for the end user an efficient use of screen real estate.

It should also be readily apparent that the illustrated grab handles or pane modification means compliment existing pane resizing functions which are normally available in graphical user interface systems by the movement of a mouse pointer over any pane border that does not contain a grab handle or a pane modification button.

To understand the way in which pane splitting is implemented it is necessary to understand the underlying representation of the tiled panes. "Tiling" means an arrangement of panes on a screen that completely covers the parent's window in such a way that the panes do not overlap. The tiling used for the purpose of this invention is a hierarchical tiling known as a quad tree.

A set, S, of n rectangular regions, $X_1$, $X_2$, through $X_n$, is a tiling of a rectangular region A if and only if no two different regions $X_i$ and $X_j$ in S overlap, and the regions in S completely cover A. More precisely, S is a tiling of A if and only if, for each point p in A, p is a member of exactly one region $X_i$ in S.

The implementation of the splitting behavior for this invention requires S to be a hierarchical tiling.

A set S, of n rectangular regions $X_1$, $X_2$, through $X_n$, is a hierarchical tiling of a rectangular region A, if and only if there exists a set, R, of rectangular regions, $Y_1$, $Y_2$. through $Y_m$, such that R is a tiling of A; each region $Y_i$ in R has the same height as A, or each region $Y_i$ in R has the same width as A; each region $X_j$ in S is completely covered by one region $Y_i$ in R; and each subset of regions of S covered by a region $Y_i$ in R is a hierarchical tiling of $Y_i$.

The definition of a hierarchical tiling is recursive thereby lending itself to a tree-based computer representation. For the purpose of the algorithm described below, a hierarchical tiling is represented as a tree of nodes where each node comes in one of three forms: a horizontal node, a vertical node, or a leaf node. Each node x has an associated rectangular region denoted by rectangleOf(x) and this rectangular region has a height denoted by heightOf(rectangleOf(x)) and a width denoted by widthOf(rectangleOf(x)).

A horizontal node h has an ordered set of two or more children, $x_1$, $x_2$, through $x_n$, such that each child is either a leaf node or a vertical node; for each child node $x_i$ belonging to h, the heightOf(rectangleOf($x_i$))=heightOf(rectangleOf(h)); for each child node $x_i$ and $x_j$, where i<j, belonging to h, each point p in $x_i$ is to the left of each point q in $X_j$ (i.e., has a smaller x-coordinate); and the set rectangleOf($x_1$), rectangleOf($x_2$), through rectangleOf($x_n$) tiles rectangleOf (h). Correspondingly, a vertical node v has an ordered set of two or more children, $x_1$, $x_2$, through $x_n$, such that each child is either a leaf node or a horizontal node; for each child node $x_i$ belonging to v, the widthOf(rectangleOf($x_i$))=widthOf (rectangleOf(v)); for each child node $x_i$ and $x_j$, where i<j, belonging to v, each point p in $x_i$ is above each point q in $x_j$ (i.e., has a larger y-coordinate, assuming a coordinate system in which y increases in the upward direction); and the set rectangleOf($x_1$), rectangleOf($x_2$) through rectangleOf ($x_n$) tiles rectangleOf(v).

And, finally, a leaf node is simply a node with no children.

With this hierarchical representation, every node x has a parent, denoted by parentOf(x), except the root node. Also, for any two different nodes x and y, there exists a lowest common ancestor node, denoted by lowestCommonAncestorOf(x, y), such that lowestCommonAncestorOf(x, y) can be reached from x and from y by a minimal number of recursive "parentOf" calls.

One aspect of the invention is that the pane splitting is initiated from a decoration or grab handle on the frame or border of the pane and that this technique allows the user to specify exactly how much space from the pane X is to be used for the new pane Y. It is also possible to implement this aspect of the invention without requiring the decoration on the pane frame. For example, the user simply holds the control key while clicking the mouse on the frame border and then the whole frame border acts as a grab handle.

The invention allows the user to do more than just split leaf panes into smaller and smaller pieces. Nodes can be introduced at any level in the tree rather than just at the leaves.

Consider the simple case of using a grab handle to split a leaf, and assume that we split from the bottom handle. We just create a rubber rectangle that aligns with the bottom, left and right of the pane and the top of the rubber rectangle follows the mouse although it does not follow the mouse outside of the starting pane. The invention, however, builds upon this idea by allowing the mouse to be moved into an adjacent pane to the left or right. Using the above general node representation the pane splitting interaction is defined by the two algorithms that follow and the first is illustrated in the flow chart of FIG. 7.

Figure 7:
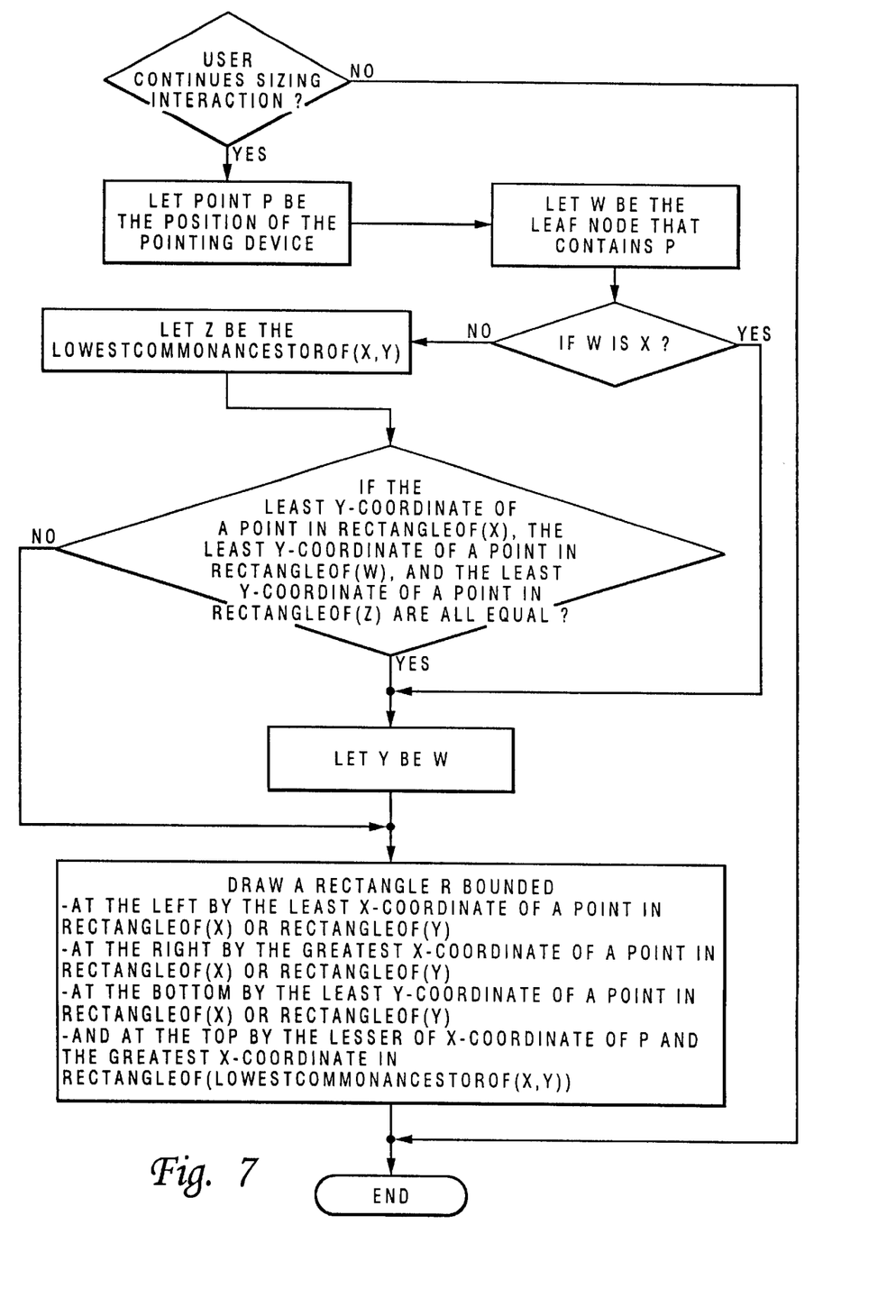
FIG. 7 is a flow chart further illustrating the pane sizing interaction algorithm to implement an aspect of the invention.

The first algorithm describes the behavior the user sees after he has initiated a splitting interaction from the bottom of some leaf node x and then continues to change the position p of the pointing device. This part of the interaction is called the sizing interaction.

```
while the user continues the sizing interaction
  begin
    let the point p be the position of the pointing device
    let w be the leaf node that contains p
    if w is x
      begin
        let y be w
      end
    else
      begin
        let z be the lowestCommonAncestorOf(x, y)
        if the least y-coordinate of a point in rectangleOf(x),
          the laast y-coordinate of a point in rectangleOf(w),
          and the least y-coordinate of a point in rectangleOf(z)
          are all equal
        begin
          let y be w
        end
      end
    draw a rectangle r bounded
      - at the left by the least x-coordinate of a point
        in rectangleOf(x) or rectangleOf(y)
      - at the right by the greatest x-coordinate of a point
        in rectangleOf(x) or rectangleOf(y)
      - at the bottom by the least y-coordinate of a point
        in rectangleOf(x) or rectangleOf(y)
      - and at the top by the lesser of x-coordinate of p and the
        greatest x-coordinate in rectangleOf
        (lowestCommonAncestorOf (x,y))
  end
```

The algorithms for a sizing interaction initiated from the right, top, or left of a pane are the same as the above algorithm when the coordinate system for the problems are rotated by 90, 180, or 270 degrees, respectively.

The next algorithm describes the behavior the user sees after he has initiated a splitting interaction from the bottom of some leaf node x and has completed the pane sizing interaction. This part of the interaction is called the pane creation interaction when the user lets go of the mouse button. The algorithm is illustrated in the flow chart of FIG. 8. The inputs to the pane creation interaction are the leaf node x from which a bottom splitting interaction was initiated, the leaf node y determined during the sizing interaction, and the rectangle r determined during the sizing interaction.

Figure 8A:
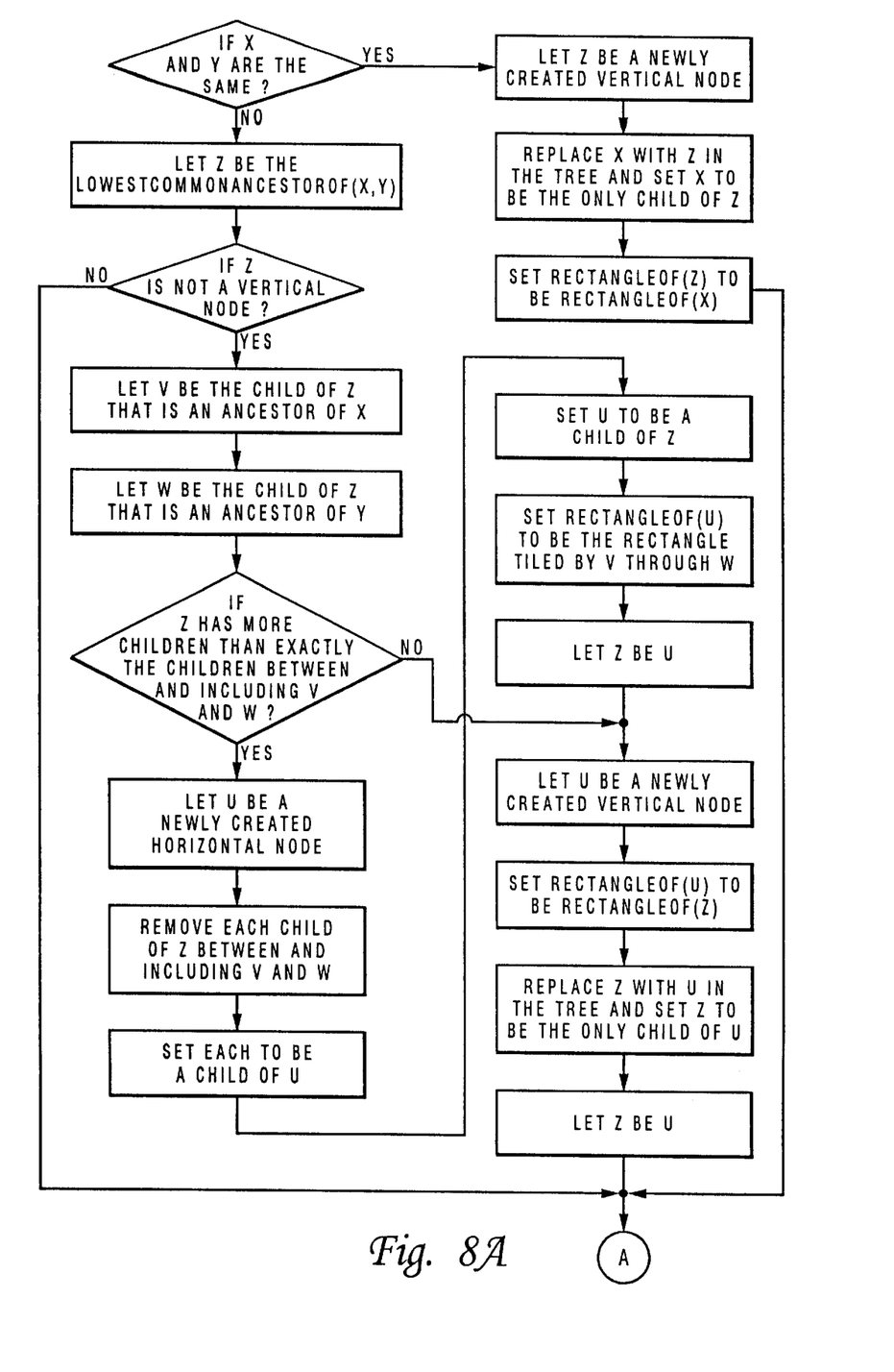
FIG. 8 is a flow chart further illustrating the pane creation interaction algorithm to implement an aspect of the invention.
Figure 8B:
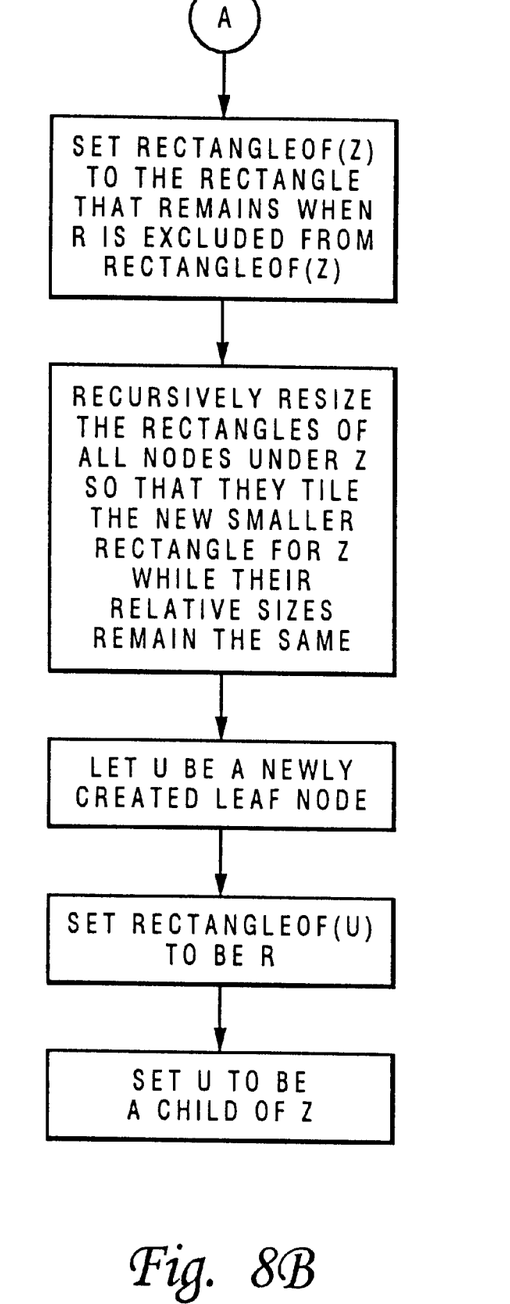

```
if x and y are the same
   begin
      let z be a newly created vertical node
      replace x with z in the tree and set x to be the only child of z
      set rectangleOf(z) to be rectangleOf(x)
   end
else
   begin
      let z be the lowestCommonAncestorOf(x, y)
      if z is not a vertical node
         begin
            let v be the child of z that is an ancestor of x
            let w be the child of z that is an ancestor of y
            if z has more children than exactly the children
                  between and including v and w
               begin
                  let u be a newly created horizontal node
                  remove each child of z between and including v and w
                     and set each to be a child of u
                  set u to be a child of z
                  set rectangleOf(u) to be the rectangle tiled by v
                     through w
                  let z be u
               end
            let u be a newly created vertical node
            set rectangleOf(u) to be rectangleOf(z)
            replace z with u in the tree and set z to be the only child of u
            let z be u
         end
      end
   end
set rectangleOf(z) to the rectangle that remains
   when r is excluded from rectangleOf(z)
recursively resize the rectangles of all nodes under z
   so that they tile the new smaller rectangle for z
   while their relative sizes remain the same
let u be a newly created leaf node
set rectangleOf(u) to be r
set u to be a child of z
```

As with the algorithms for a sizing interaction, the algorithms for a pane creation interaction initiated from the right, top, or left of a pane are the same as the above algorithm when the coordinate system for the problems are rotated by 90, 180, or 270 degrees, respectively.

While the invention has been particularly shown and described with reference to the preferred embodiment, it will be understood by those skilled in the art that various changes in form and detail may be made therein without departing from the spirit and scope of the invention.

What is claimed is:

1. A method for controlling the size and number of panes in a window on a display screen within a data processing system, wherein said data processing system includes a user control for manipulating a cursor on said display screen, said method comprising the steps of:

displaying a hierarchical tiling of a window on said display screen including a plurality of existing panes and a first pane having a pane modification means;

activating said pane modification means in response to a manipulation of said user control;

displaying a rectangular form having a variable size and position adjacent to said first pane in response to an activation of said pane modification means;

altering the size and position of said rectangular form to occupy an area of said window within an existing pane in response to a manipulation of said user control;

displaying a new pane within said hierarchical tiling of said window within said area; and automatically repositioning and proportionally resizing said plurality of existing panes within said hierarchical tiling of said window to accommodate said new pane.

2. The method as set forth in claim 1, wherein said step of displaying a hierarchical tiling of a window on said display screen comprises the step of altering the appearance of said cursor upon movement of said cursor over said pane modification means.

3. The method as set forth in claim 1, wherein said user control comprises a mouse including a button, said step of activating said pane modification means comprises the step of depressing said button while said cursor is positioned over said pane modification means; and said step of displaying a new pane within said hierarchical tiling of said window comprises the step of releasing said button.

4. The method as set forth in claim 1, wherein said pane modification means comprises a grab handle, said step of displaying a hierarchical tiling of a window on said display screen comprises the step of displaying said grab handle within a border of said first pane; and said step of displaying a rectangular form having a variable size and position comprises the step of displaying a rectangular form having a variable size and position adjacent to said border of said first pane.

5. A method for inserting a pane into a hierarchical tiling of a window on a display screen within a data processing system, wherein said data processing system includes a user control for manipulating a cursor on said display screen, and said hierarchical tiling includes a plurality of existing panes, wherein said plurality of existing panes includes a first pane having a pane modification means, said method comprising the steps of:

activating said pane modification means in response to a manipulation of said user control;

displaying a rectangular form having a variable size adjacent to said first pane in response to an activation of said pane modification means;

altering the size of said rectangular form to occupy an area of said window included within one or more of said plurality of existing panes in response to a manipulation of said user control;

displaying a new pane within said hierarchical tiling of said window within said area; and automatically proportionally resizing said plurality of existing panes within said hierarchical tiling to accommodate said new pane such that the relative sizes of each of said plurality of existing panes remains the same.

6. A data processing system for controlling the size and number of panes in a hierarchical tiling of a window comprising:

a display screen;

a user control for manipulating a cursor on said display screen;

means for displaying a plurality of existing panes and a first pane having a pane modification means within said hierarchical tiling;

means for activating said pane modification means in response to a manipulation of said user control;

means for displaying a rectangular form having a variable size and position adjacent to said first pane in response to an activation of said pane modification means;

means for altering the size and position of said rectangular form to occupy an area of said window within an existing pane in response to a manipulation of said user control;

means for displaying a new pane within said hierarchical tiling of said window within said area; and automatically repositioning and proportionally resizing said plurality of existing panes within said hierarchical tiling of said window to accommodate said new pane.

7. The data processing system as set forth in claim 6, wherein the appearance of said cursor is altered upon movement of said cursor over said pane modification means.

8. The data processing system as set forth in claim 6, wherein said user control comprises a mouse including a button.

9. The data processing system as set forth in claim 6, wherein:

said pane modification means comprises a grab handle within a border of said first pane; and said means for displaying a rectangular form having a variable size and position comprises means for displaying a rectangular form having a variable size and position adjacent to said border of said first pane.

10. A program product for controlling the size and number of panes in a window on a display screen within a data processing system, wherein said data processing system includes a user control for manipulating a cursor on said display screen, said program product comprising:

a data processing system usable medium; and program code means, encoded within said data processing system usable medium, for displaying a plurality of existing panes and a first pane having a pane modification means within said hierarchical tiling;

program code means, encoded within said data processing system usable medium, for activating said pane modification means in response to a manipulation of said user control;

program code means, encoded within said data processing system usable medium, for displaying a rectangular form having a variable size and position adjacent to said first pane in response to an activation of said pane modification means;

program code means, encoded within said data processing system usable medium, for altering the size and position of said rectangular form to occupy an area of said window within an existing pane in response to a manipulation of said user control;

program code means, encoded within said data processing system usable medium, for displaying a new pane within said hierarchical tiling of said window within said area; and program code means, encoded within said data processing system usable medium, for automatically repositioning and proportionally resizing said plurality of existing panes within said hierarchical tiling of said window to accommodate said new pane.

11. The program product as set forth in claim 10, said program product further comprising program code means, encoded within said data processing system usable medium, for altering the appearance of said cursor upon movement of said cursor over said pane modification means.

12. The program product as set forth in claim 10, wherein said user control comprises a mouse including a button, said program code means for activating said pane modification means comprises program code means, encoded within said data processing system usable medium, for activating said pane modification means in response to a depression of said button while said cursor is positioned over said pane modification means; and said program code means for displaying a new pane within said hierarchical tiling of said window comprises program code means, encoded within said data processing system usable medium, far displaying a new pane within said hierarchical tiling of said window within said area in response to a release of said button.

13. A program product for inserting a pane into a hierarchical tiling of a window on a display screen within a data processing system, wherein said data processing system includes a user control for manipulating a cursor on said display screen, and said hierarchical tiling includes a plurality of existing panes, wherein said plurality of existing panes includes a first pane having a pane modification means, said program product comprising:

a data processing system usable medium;

program code means, encoded within said data processing system usable medium, for activating said pane modification means in response to a manipulation of said user control;

program code means, encoded within said data processing system usable medium, for displaying a rectangular form having a variable size adjacent to said first pane in response to an activation of said pane modification means;

program code means, encoded within said data processing system usable medium, for altering the size of said rectangular form to occupy an area of said window included within one or more of said plurality of existing panes in response to a manipulation of said user control;

program code means, encoded within said data processing system usable medium, for displaying a new pane within said hierarchical tiling of said window within said area; and automatically proportionally resizing said plurality of existing panes within said hierarchical tiling of said window to accommodate said new pane such that the relative sizes of each of said plurality of existing panes remains the same.

\* \* \* \* \*